Figure 1:
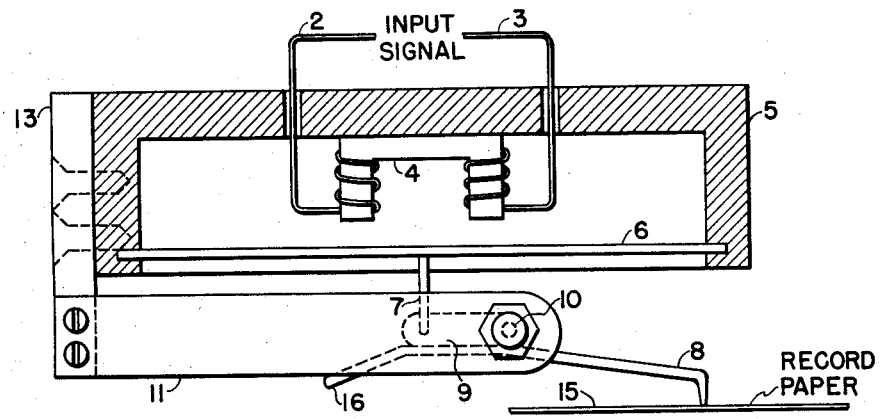

July 14, 1959

R. A. KIRBY ET AL 2,894,797

RECORDING SYSTEM

Filed Nov. 30, 1954

2 Sheets-Sheet 1

Robert A. Kirby
Henry B. Ferguson      Inventors
Clarence S. Clay, Jr.

By W. N. Wright  Attorney

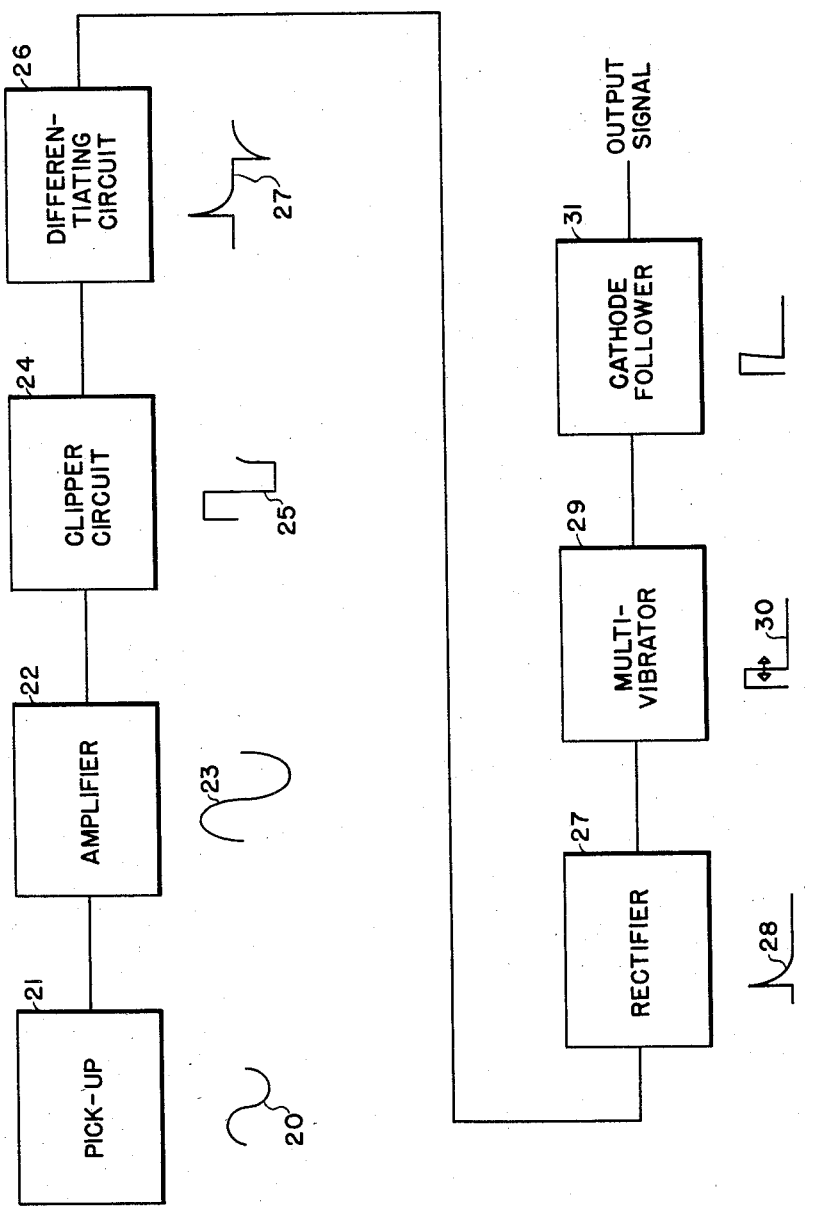

United States Patent Office 2,894,797
Patented July 14, 1959

2,894,797

RECORDING SYSTEM

Robert A. Kirby, Clarence S. Clay, Jr., and Henry B. Ferguson, Tulsa, Okla., assignors, by mesne assignments, to Jersey Production Research Company Application November 30, 1954, Serial No. 472,032

6 Claims. (Cl. 346—74)

This invention concerns a recording arrangement which is particularly intended for the recording of seismic information obtained during seismic prospecting. The apparatus of this invention provides a simple and effective recording system for preparing permanent seismic records. The invention is specifically concerned with a recording pen arrangement operative for extremely high frequency records.

In exploration for oil, one of the basic prospecting techniques is "seismic prospecting." In prospecting by this method, seismic shocks are developed at the surface of the earth by means of an explosion of dynamite or the like. The shot generates seismic waves which travel downwardly into the earth to be reflected in part from different substrata. Seismic pick-ups or geophones positioned in selected arrays at the surface of the earth are used to receive the reflected seismic energy. By accurate timing methods, it is then possible to determine the depth of reflecting substrata. This general technique can be used to obtain information indicating the cross-sectional make-up of the earth at considerable depths.

Interest has recently centered on magnetic recording techniques for recording the output of seismic detectors. Magnetic recording has several distinct advantages over other recording systems such as photographic recording. In the magnetic recording method, each seismic trace to be recorded is supplied to a magnetic recording head which stores the signal on a magnetic tape. A feature of the magnetic recording technique is that the output of geophones can be directly recorded with a flat response amplifier so as to faithfully reproduce the signals received at geophones during prospecting. Subsequently, suitable filtering, phasing, or other modification of the directly recorded seismic signals can be made by playing back the magnetically recorded signals and processing these as desired. It is generally preferred to analyze the recorded signals at a laboratory and to restrict field operations to essential monitoring.

For analysis of such magnetically recorded seismic information, it is clearly necessary to translate the magnetic records into some form of permanent record. The present invention is concerned with a recording movement and pen arrangement, which makes possible the faithful and accurate reproduction of seismic magnetic records in the form of a permanent record. The recording arrangement of this invention can be used to prepare a permanent record by any technique causing a mark to appear on a record paper on contact with a stylus or pen with the paper. Thus, this invention can be used in so-called hot wire recording, contact recording, where a mark may be reproduced in a manner similar to a typewriter or other conventional techniques. However, the invention will be described with particular reference to the use of the invention for preparing a permanent inked record in which the recording element is a pen.

In one embodiment of this invention, means are provided to prepare a permanent record from magnetically recorded seismographs. It is a particular feature that such records are prepared as variable density records.

The variable density recording of seismic signals has many advantages. Speaking generally, the technique is particularly attractive in producing the seismic information in such a form that visual cross-sectional areas of the earth can be readily displayed by suitably assembling the seismic records obtained. This feature greatly simplifies the problems of interpreting seismic information and in many cases serves to establish information which could not be obtained from a study of galvanometer traces. However, one of the disadvantages of the variable density photographic recording techniques heretofore used resides in the necessity for having and using rather complicated photographic equipment in the field. Again, the direct recording of seismic signals photographically limits the possibilities for desired flexibility in using selected filters, different phasing circuits, etc.

It is therefore one of the objects of this invention to provide a non-photographic, variable density recording technique.

In accordance with this aspect of the invention, seismic signals are frequency modulated by a carrier signal of about 200 to 1000 cycles per second. This is carried out by mixing the seismic signal to be recorded, at the time of receipt at a geophone, with a fixed frequency signal. The frequency modulated signal is then directly recorded employing the techniques of this invention or alternatively and preferably is magnetically recorded in the field. In this case, the present invention is employed subsequently to prepare a permanent playback record from the magnetically recorded record.

The recording technique of this invention employs means to drive a stylus or pen from frequency modulated signals. The stylus or pen is brought into contact with a recording paper at each cycle of the signal to be recorded. By moving a record media below the pen at a fixed rate of speed, the spacing between recording marks will be inversely proportional to the frequency of the signal. Preferably, the stylus or pen is constructed to have a widened tip so that a recording mark ⅛" or more in width is made at each contact. A record prepared in this manner is made up of a multitude of closely spaced parallel marks with the high frequency portions of the record appreciably "darker" to visual inspection, thus simulating a variable density photographic record.

The present invention is also of particular application in making fiduciary marks or time marks on a record. The invention is of particular interest in this application, since the preparation of accurate seismic records for magnetic recordings may and often does cause distortion and inaccuracy due to variation of speed of the magnetic recording arrangement, either during recording or during playback. Any change in the speed of the magnetic drum would cause apparent errors in the seismic information. This is particularly critical since it is ordinarily desired to secure information at intervals as short as 6 milliseconds. An error of more than this magnitude can be developed in a magnetic recording system having speed variations of only a few percent. It is therefore a specific object of this invention to provide apparatus for placing accurate time marks on the permanent record derived from a magnetic recording so that errors of the nature referred to can be eliminated on analyzing the record by reference to the time marks.

Figure 2:
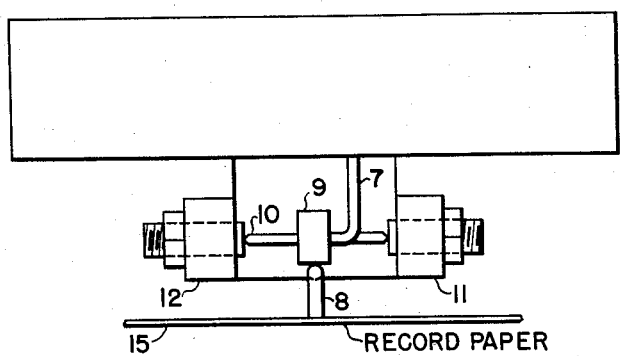

The nature of this invention is illustrated in the accompanying drawings which diagrammatically indicate the essential features of the invention. In the drawings:

Figure 1 diagrammatically illustrates in cross-sectional elevational detail the recording movement of this invention; and Figure 2 is a right-side view of Figure 1, particularly showing the pivotal arrangement and lever system of the recording pen; and Figure 3 illustrates a block diagram of the essential electrical circuit used in converting a magnetic signal to an electrical signal of the character required for activation of the recording system of Figures 1 and 2 in practicing the present invention.

Referring first to Figures 1 and 2, the recording head of this invention is illustrated. The input signal which is to be recorded is supplied across terminals 2 and 3, impressing this signal on an electro magnet 4 supported in a housing 5. A ferro magnetic diaphragm 6 is supported by housing 5 so that the center of the diaphragm is in proximity to the pole pieces of the electro magnet 4. In the practice of this invention it is particularly preferred that diaphragm 6 have a resonant frequency of the same magnitude as the frequency of the signal to be recorded. With this consideration in view, diaphragm 6 is preferably circular in nature so that both diaphragm 6 and housing 5 in a top view would be circular. A mechanical linkage 7, which can simply be a rod element fixed to the center of diaphragm 6, extends downwardly to activate a lever system in a manner to control movements of pen 8. Link 7 is pivotally fixed to a cam 9 which is in turn pivotally supported at point 10. Pivot 10 is fixed with respect to housing 5 and diaphragm 6, and may be carried by yoke support elements 11 and 12, which are fixed to support member 13 which in turn is in fixed relation with housing 5. The recording pen 8 is fixed to and carried by cam 9 in the manner illustrated. It is apparent that mechanical link 7, cam 9, and the extending pen 8 define a first class lever system so that relatively small vertical movements of link 7 can cause substantial vertical movements of the pen 8. A record paper or recording medium 15 is positioned so that pen 8 can contact the record paper on activation of the lever system.

When used as an inking arrangement, pen 8 can constitute a hollow tube so that ink may be supplied to the pen through termination 16 as by means of a flexible ink supply line. Contact of pen 8 with record paper 15 will then cause an inked mark to be made. It is apparent that means are employed to move record paper 15 below pen 8 in order to secure continuous records.

The arrangement described is particularly adapted for the objects of this invention in providing an extremely fast recording movement. For example, it has been found that an armature and solenoid arrangement cannot be used in seismic recording since such movements are not nearly fast enough to meet the requirements. However, by using the movement illustrated, depending upon utilization of the resonant diaphragm, extremely fast responses can be obtained. It is apparent, of course, that movements of a diaphragm in the arrangement described, are extremely small so that an important and essential feature of the invention is the use of a lever system of the nature indicated. The first class lever system described is particularly desirable in making possible vertical movements of the pen over as much as ⅛ of an inch, activated by movements of the diaphragm as small as ¹⁄₆₄ of an inch.

As indicated, one of the most attractive applications for the recording movement illustrated and described is for preparing fiduciary marks on a record. In this application, a fixed frequency timing signal is employed which for seismic purposes may have a frequency of about 100 cycles. Diaphragm 6 can be particularly designed so as to have a resonant frequency corresponding to this or other recording frequencies so that very little power will be required to drive the recording pen.

It is an essential feature of this invention that the electrical input signal provided to the movement described should be of a particular character. Figure 3 illustrates a block diagram of a suitable circuit for developing the signal required in using the apparatus of Figures 1 and 2.

It is assumed that it is desired to record a signal having the conventional sinusoidal form illustrated by trace 20. Trace 20, for example, can correspond to one cycle of a 100 cycle per second timing signal. When the invention is employed in connection with the magnetic recording of seismic signals, a 100 cycle timing signal will originally be developed by a fixed frequency oscillator, and will be supplied to the magnetic recording head of the magnetic recording system at the time seismic signals are recorded. On subsequent playback, a magnetic pick-up indicated by rectangle 21 will be used to convert the magnetically recorded timing signal to the sinusoidal voltage illustrated by trace 20.

The timing signal will then be amplified in amplifier 22 providing an amplified output indicated by trace 23. The output of amplifier 22 is then impressed on a clipper circuit 24 which essentially converts trace 23 to the square wave form 25. The output of clipper circuit 24 is then supplied to a differentiating circuit 26 resulting in a signal form illustrated by trace 27. Thus, at the leading edge of each of the pulses 25, differentiating circuit 26 will cause a sharp voltage variation, decaying swiftly to the base line value. For the purposes of this invention, only the positive pulses of trace 27 are to be employed so that to eliminate the negative pulses, a rectifier such as a germanium diode can be incorporated in the differentiating circuit 26, although this element of the invention is separately illustrated by rectangle 27. The one-way transmission characteristics of the rectifier results in eliminating the negative pulses of trace 27 providing a trace form identified by number 28. The sharp pulses 28 are then supplied to a one-shot multi-vibrator circuit 29 which serves to provide a rectangular pulse having essentially vertical sides and square form. A pulse width control is incorporated in multi-vibrator 29, so that the output of this circuit will provide a pulse of variable width as illustrated by trace 30. This signal can then be used to drive the recording movement described, and for this purpose a cathode follower drive circuit 31 is preferably employed.

Dependent upon the frequency response of the multi-vibrator system and other recording variables, the pulse width of trace 30 is adjusted by trial and error to secure the best recording results. It is necessary that the pulse width be sufficient so that the pen of the recording movement will be caused to make positive contact with the recording paper before expiration of the activating pulse. Variations in the timing and nature of the recording signal due to changes in amplitude of the timing signal picked up by pick-up 21 are eliminated in the circuit described. Changes in the recording or playback speed of the magnetic recording system which would ordinarily cause changes in the frequency and wave form of the timing signal, will result only in time translation of the pulse 30 with respect to the next successive pulse. In this manner periodic fiduciary marks may be placed on the permanent record obtained by playback of the magnetic record.

In using the recording head and circuit described for preparing variable density permanent records, the same principles are followed. In this case, the signal input to the circuit of Figure 3 constitutes a frequency modulated seismic signal rather than a fixed frequency timing signal. The recording head of the character described must be particularly designed and selected so as to have a resonant frequency substantially that of the frequency modulated signal to be recorded. In this connection it is desirable in the practice of this invention to use a carrier frequency of about 200 to 1000 cycles per second. The seismic signals to be recorded are all low frequency signals so that the modulated signal is in the general range of about 100 to 1100 cycles per second. It is convenient and practical to construct recording heads of the character described so as to have a resonant response in these general frequency ranges. It is a particular feature of this invention that the resonant frequency of the recording head should peak at a frequency at the upper range of the signals to be recorded. This is an important feature since the highest frequency signals to be recorded will then be supplied to a recording head having the greatest response at these high frequencies. There will thus be a tendency for the recording head described to produce records of somewhat greater intensity at the higher frequencies and somewhat lesser intensity at the lower frequencies. This effect combines with the spacing of the lines produced to provide a clearly intelligible variable density recording.

What is claimed is:

1. An apparatus for recording a substantially constant amplitude sinusoidal-type electrical signal which comprises in combination a recording pen element, a recording medium arranged to move relative to said pen, electrical circuit means responsive to a portion of the sinusoidal signal occuring at substantially the same phase angle in each cycle of the sinusoidal signal and adapted to develop a square-wave pulse for each said portion, each said pulse having substantially constant amplitude and duration, electromagnetic means arranged to effect contact between said pen and said recording medium in response to each square-wave pulse, and means for adjusting the amount of energy within each said pulse to obtain positive contact between said pen and said medium.

2. An apparatus for preparing a variable density type record of a sinusoidal-type electrical signal of variable amplitude which comprises in combination, means for generating a constant frequency constant amplitude electrical signal having a greater frequency than the signal of variable amplitude, means for modulating the constant frequency signal with the variable amplitude signal, means for detecting the magnitude of the portion of the frequency modulated signal which is developed at substantially the same phase angle in each cycle of the frequency modulated signal, electrical circuit means arranged to develop a square-wave pulse in response to each said portion, each said square-wave pulse having substantially equal amplitude and duration, a recording pen and recording medium combination, electromechanical means arranged to contact said pen with said medium once in response to each square-wave pulse, and electrical circuit means for adjusting the duration of each square-wave pulse.

3. An apparatus for recording a seismic signal in variable density form which comprises means for frequency modulating a constant frequency constant amplitude carrier wave with the seismic signal, means for making a magnetic record of the modulated carrier, means for reproducing the magnetically recorded carrier to provide a modulated signal having substantially constant amplitude, clipper circuit means for changing the wave form of the reproduced signal to a square-shaped form, circuit means for differentiating the square-wave signal, triggering means responsive to each positive differentiated portion of the square-wave signal for providing a square-wave pulse, each square-wave pulse having substantially constant amplitude and duration, a recording pen, a ferromagnetic diaphragm, a first-class lever linking said diaphragm to said recording pen, an electromagnet spaced from said diaphragm, said pen, lever, diaphragm and electromagnet being arranged such that the square-wave pulses from the triggering means are fed to the electromagnet to mechanically and periodically actuate the recording pen, a recording medium movable relative to the recording pen, and means for adjusting the duration of each square-wave pulse to attain positive contact between said pen and said medium in response to each said square-wave pulse.

4. An apparatus as defined in claim 3 in which the triggering means is a one-shot multi-vibrator.

5. An apparatus as defined in claim 3 in which the carrier wave has a frequency of about 200 to 1000 cycles per second.

6. An apparatus as defined in claim 3 in which the diaphragm has a resonant frequency of the same magnitude as the frequency of the square-wave pulses.

References Cited in the file of this patent

UNITED STATES PATENTS 2,632,815     Crespinel _____ Mar. 24, 1953